United States Patent
Sanchez Rola

(10) Patent No.: US 12,381,913 B1
(45) Date of Patent: Aug. 5, 2025

(54) SYSTEMS AND METHODS FOR UTILIZING CONTEXTUAL DIGITAL FINGERPRINTS TO PROTECT AGAINST BROWSER-BASED MALICIOUS ATTACKS

(71) Applicant: GEN DIGITAL INC., Tempe, AZ (US)

(72) Inventor: Iskander Sanchez Rola, Antibes (FR)

(73) Assignee: Gen Digital Inc., Tempe, AZ (US)

( * ) Notice: Subject to any disclaimer, the term of this patent is extended or adjusted under 35 U.S.C. 154(b) by 275 days.

(21) Appl. No.: 17/932,187

(22) Filed: Sep. 14, 2022

(51) Int. Cl.
H04L 9/40 (2022.01)

(52) U.S. Cl.
CPC ........ H04L 63/1483 (2013.01); H04L 63/029 (2013.01); H04L 63/067 (2013.01); H04L 63/0281 (2013.01)

(58) Field of Classification Search
CPC . H04L 63/1483; H04L 63/029; H04L 63/067; H04L 63/0281
See application file for complete search history.

(56) References Cited

U.S. PATENT DOCUMENTS

| | | | | |
|---|---|---|---|---|
| 10,419,431 | B2 * | 9/2019 | Long | H04L 67/01 |
| 10,474,559 | B2 * | 11/2019 | Moorthi | G06F 11/368 |
| 11,017,075 | B1 * | 5/2021 | Hatem | G06F 21/10 |
| 11,455,641 | B1 * | 9/2022 | Shahidzadeh | H04L 63/0892 |
| 2015/0163311 | A1 * | 6/2015 | Heath | G06Q 50/01 709/204 |
| 2020/0082413 | A1 * | 3/2020 | Tseng | G06F 21/554 |

* cited by examiner

*Primary Examiner* — Sm A Rahman
(74) *Attorney, Agent, or Firm* — Greenberg Traurig, LLP

(57) ABSTRACT

The disclosed computer-implemented method for utilizing contextual digital fingerprints to protect against browser-based malicious attacks may include (i) detecting an execution of one or more fingerprinting application programming interface (API) calls utilized by a target website for providing access to a user, (ii) generating identity data comprising specific values for each of the fingerprinting API calls to create a contextual digital fingerprint, (iii) storing the contextual digital fingerprint for consecutive accesses to the target website, and (iv) performing a security action that, based on the identity data in the contextual digital fingerprint, protects against browser-based malicious attacks attempting to access the target website. Various other methods, systems, and computer-readable media are also disclosed.

20 Claims, 7 Drawing Sheets

SYSTEMS AND METHODS FOR UTILIZING CONTEXTUAL DIGITAL FINGERPRINTS TO PROTECT AGAINST BROWSER-BASED MALICIOUS ATTACKS

BACKGROUND

Computing device users are increasingly being targeted by sophisticated malicious attacks designed to bypass enhanced security protections, such as browser fingerprinting and two-factor authentication, utilized to protect against the unintentional disclosure of sensitive information (e.g., banking or healthcare information) on websites and/or mobile applications to malicious actors. For example, a sophisticated phishing attack scam may include utilizing a phishing website designed to deceive a victim into providing their online identity information (e.g., user account login credentials) and then peddling this information, along with a browser extension configured to replicate the victim's digital fingerprint, to bypass enhanced security protections (such as two-factor authentication provided by the corresponding legitimate website) for accessing user private data.

Traditional approaches for preventing ordinary malicious attacks may often include utilizing browser extensions that either block any digital fingerprinting creation capabilities or randomly modify the generation of fingerprints to create different ones each time. However, both of these approaches would negate the use of a single and repeatable browser fingerprint for providing consecutive accesses to websites for the purpose of providing enhanced security protections for users.

SUMMARY

As will be described in greater detail below, the present disclosure describes various systems and methods for utilizing contextual digital fingerprints to protect against browser-based malicious attacks.

In one example, a method for utilizing contextual digital fingerprints to protect against browser-based malicious attacks may include (i) detecting, by one or more computing devices, an execution of fingerprinting application programming interface (API) calls utilized by a target website for providing access to a user, (ii) generating, by the one or more computing devices, identity data including specific values for each of the fingerprinting API calls to create a contextual digital fingerprint, (iii) storing, by the one or more computing devices, the contextual digital fingerprint for consecutive accesses to the target website, and (iv) performing, by the one or more computing devices, a security action that, based on the identity data in the contextual digital fingerprint, protects against browser-based malicious attacks attempting to access the target website.

In some examples, the execution of the fingerprinting API calls may be detected by (i) monitoring, by a web browser and/or a browser extension, and in real-time, the execution of the fingerprinting API calls and (ii) identifying programming code functions (e.g., JavaScript functions) returned in response to the fingerprinting API calls. In some examples, the identity data may be generated by linking the contextual digital fingerprint with a predetermined location. In one example, a virtual private network (VPN) tunnel may be utilized to link the contextual digital fingerprint with a geographic location associated with a user accessing the target website. In another example, a proxy mat be utilized to link the contextual digital fingerprint with a geographic location associated with a user accessing the target website.

In some examples, the identity data may further be generated by (i) receiving data identifying new fingerprinting API calls utilized by the target website, (ii) generating new identity data for each of the new fingerprinting API calls, and (iii) updating the contextual digital fingerprint based on the new identity data. Additionally, the identity data may be generated by generating the specific values for each of a group of calls to a programming code function (e.g., a JavaScript function).

In some examples, the contextual digital fingerprint may be stored by saving it as encrypted data to a local client storage device. Additionally or alternatively, the contextual digital fingerprint may be stored by saving it to a password manager service. In some examples, the security action may include preventing a phishing website utilized in the browser-based malicious attacks from accessing the identity data generated for the contextual digital fingerprint. In one example, the contextual digital fingerprint may be created utilizing a web browser (e.g., a custom web browser) or web browser extension.

In one embodiment, a system for utilizing contextual digital fingerprints to protect against browser-based malicious attacks may include at least one physical processor and physical memory that includes computer-executable instructions and a group of modules that, when executed by the physical processor, cause the physical processor to (i) detect, by a detection module, an execution of fingerprinting application programming interface (API) calls utilized by a target website for providing access to a user, (ii) generate, by an identity module, identity data comprising specific values for each of the fingerprinting API calls to create a contextual digital fingerprint, (iii) store, by a storage module, the contextual digital fingerprint for consecutive accesses to the target website, and (iv) perform, by a security module, a security action that, based on the identity data in the contextual digital fingerprint, protects against browser-based malicious attacks attempting to access the target website.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect an execution of fingerprinting application programming interface (API) calls utilized by a target website for providing access to a user, (ii) generate identity data comprising specific values for each of the fingerprinting API calls to create a contextual digital fingerprint, (iii) store the contextual digital fingerprint for consecutive accesses to the target website, and (iv) perform a security action that, based on the identity data in the contextual digital fingerprint, protects against browser-based malicious attacks attempting to access the target website.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
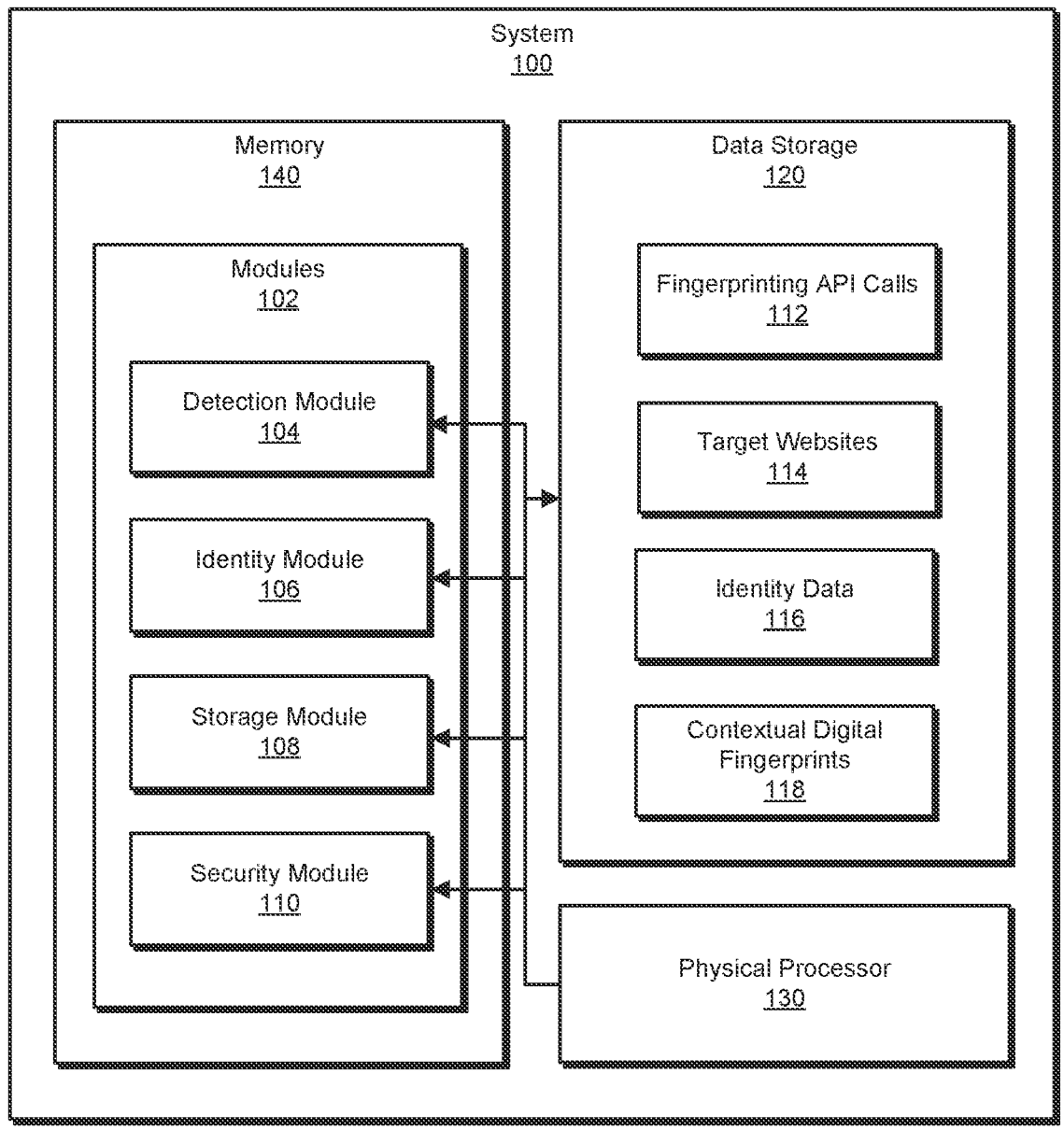
FIG. 1 is a block diagram of an example system for utilizing contextual digital fingerprints to protect against browser-based malicious attacks.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for utilizing contextual digital fingerprints to protect against browser-based malicious attacks. As will be described in greater detail below, the systems and methods described herein may create contextual digital fingerprints for a set of predefined websites, a set of websites associated with a user account, and/or any website accessed by a user from a browser, that will enable the continuing use of provided web services (e.g., banking, healthcare, etc.) while also avoiding malicious attacks (e.g., phishing attacks such as identity theft) utilizing stolen identities to bypass traditional security protections, such as two-factor authentication. In some examples, the contextual digital fingerprints may be created by detecting the different fingerprinting APIs utilized by a website, viewing any API function calls (e.g., JavaScript function calls), and then generating specific values for each of the calls. By creating contextual digital fingerprints in this way (and subsequently storing them for consecutive accesses to their associated websites), the systems and methods described herein may enable users to access these websites without any anomalies being detected while also preventing malicious actors from carrying out malicious attacks (e.g. phishing) utilizing stolen credentials to create fraudulent user digital fingerprints, as these fingerprints will be rejected as being different than the contextual digital fingerprints. In addition, the systems and methods described herein may improve the technical field of computing device security by protecting against malicious attacks (e.g., making financial institution money transfers or accessing healthcare service medical records) designed to bypass traditional security protections, such as two-factor authentication, for protecting private user data.

Figure 2:
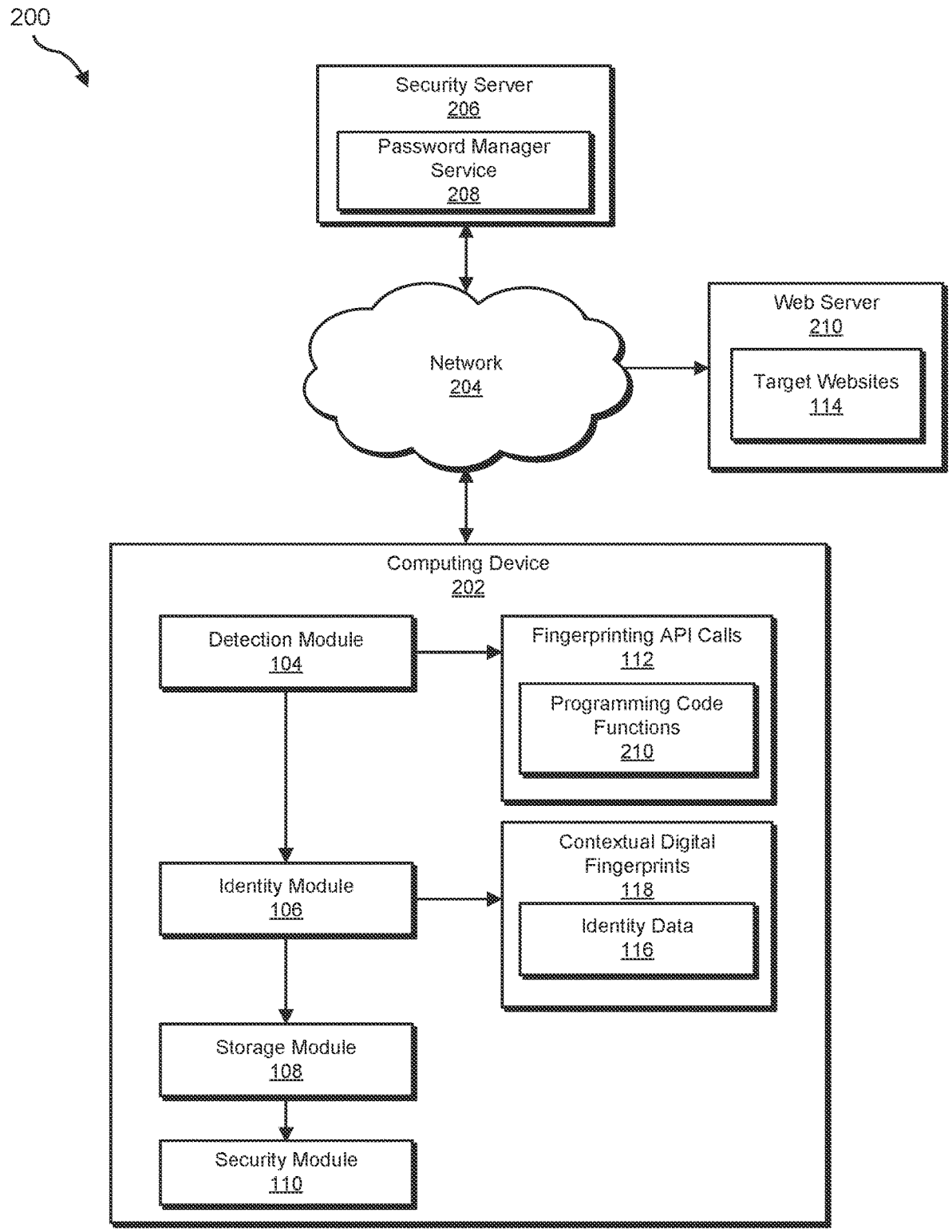
FIG. 2 is a block diagram of an additional example system for utilizing contextual digital fingerprints to protect against browser-based malicious attacks.

The following will provide, with reference to FIGS. 1-2, detailed descriptions of example systems for utilizing contextual digital fingerprints to protect against browser-based malicious attacks. Detailed descriptions of corresponding computer-implemented methods will also be provided in connection with FIGS. 3 and 5. In addition, a detailed description of an example system for creating contextual digital fingerprints to protect against browser-based malicious attacks, will also be provided in connection with FIG. 4. In addition, detailed descriptions of an example computing system and network architecture capable of implementing one or more of the embodiments described herein will be provided in connection with FIGS. 6 and 7, respectively.

FIG. 1 is a block diagram of an example system 100 for utilizing contextual digital fingerprints to protect against browser-based malicious attacks. As illustrated in this figure, example system 100 may include one or more modules 102 for performing one or more tasks. As will be explained in greater detail below, modules 102 may include a detection module 104 that detects an execution of fingerprinting API calls 112 utilized by a target website 114 for providing access to a user. Example system 100 may additionally include an identity module 106 that generates identity data 116 including specific values for each of fingerprinting API calls 112 to create a contextual digital fingerprint 118. Example system 100 may also include a storage module 108 that stores a contextual digital fingerprint 118 for consecutive accesses to a target website 114. Example system 100 may additionally include a security module 110 that performs a security action that, based on identity data 116 in a contextual digital fingerprint 118, protects against browser-based malicious attacks attempting to access a target website 114. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or security server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate utilizing contextual digital fingerprints to protect against browser-based malicious attacks. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store fingerprinting API calls 112, target websites 114, identity data 116, and contextual digital fingerprints 118.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with security server 206 and a web server 210 via a network 204. In one example, all or a portion of the functionality of modules 102 may be performed by computing device 202, security server 206, and/or any other suitable computing system. As will be described in greater detail below, one or more of modules 102 from FIG. 1 may, when executed by at least one processor of computing device 202 and/or security server 206, enable computing device 202 and/or security server 206 to utilize contextual digital fingerprints to protect against browser-based malicious attacks.

For example, detection module 104 may detect an execution of fingerprinting API calls 112 utilized by a target website 114 for providing access to a user. Next, identity module 106 may generate identity data 116 (utilizing programming code functions 212) including specific values for each of fingerprinting API calls 112 to create a contextual digital fingerprint 118 (including identity data 116). Then, storage module 108 may store a contextual digital fingerprint 118 for consecutive accesses to target website 114. Finally, security module 110 may perform a security action that, based on identity data 116 in a contextual digital fingerprint 118, protects against browser-based malicious attacks attempting to access a target website 114.

The term "fingerprinting API calls" as used herein, generally refers to function calls (e.g., script calls) to various APIs utilized by websites for obtaining information from a web browser to identify a user (i.e., a fingerprint) during browsing sessions. For example, when a user visits a website page, the website may be configured to execute a script for calling an API (e.g., HTMLCanvasElement) that returns encoded pixel data for serving as a user fingerprint during user browsing sessions.

The term "contextual digital fingerprints" as used herein, generally refers to a browser fingerprint for which specific values are generated for each of the calls (i.e., API function calls) utilized by a website in creating the browser fingerprint. For example, a contextual digital fingerprint may be generated by utilizing specific values for a JavaScript function call for color modification (e.g., a color modification of X tones for every Y pixels) on a webpage.

Computing device 202 generally represents any type or form of computing device capable of reading and/or executing computer-executable instructions. In some examples, computing device 202 may represent an endpoint device such as a mobile or desktop computing device running a browser application for viewing and accessing websites. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Security server 206 and web server 210 generally represent any type or form of computing device that is capable of reading computer-executable instructions. In some examples, security server 206 may provide threat protection services for web browsers (such as password manager service 208). In some examples, web server 210 may facilitate browser access to target websites 114. Additional examples of security server 206 and web server 210 include, without limitation, application servers, storage servers, and/or database servers configured to run certain software applications and/or provide various storage and/or database services. Although illustrated as a single entity in FIG. 2, security server 206 and web server 210 may include and/or represent a plurality of servers that work and/or operate in conjunction with one another.

Network 204 generally represents any medium or architecture capable of facilitating communication or data transfer. In one example, network 204 may facilitate communication between computing device 202, security server 206, and web server 210. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
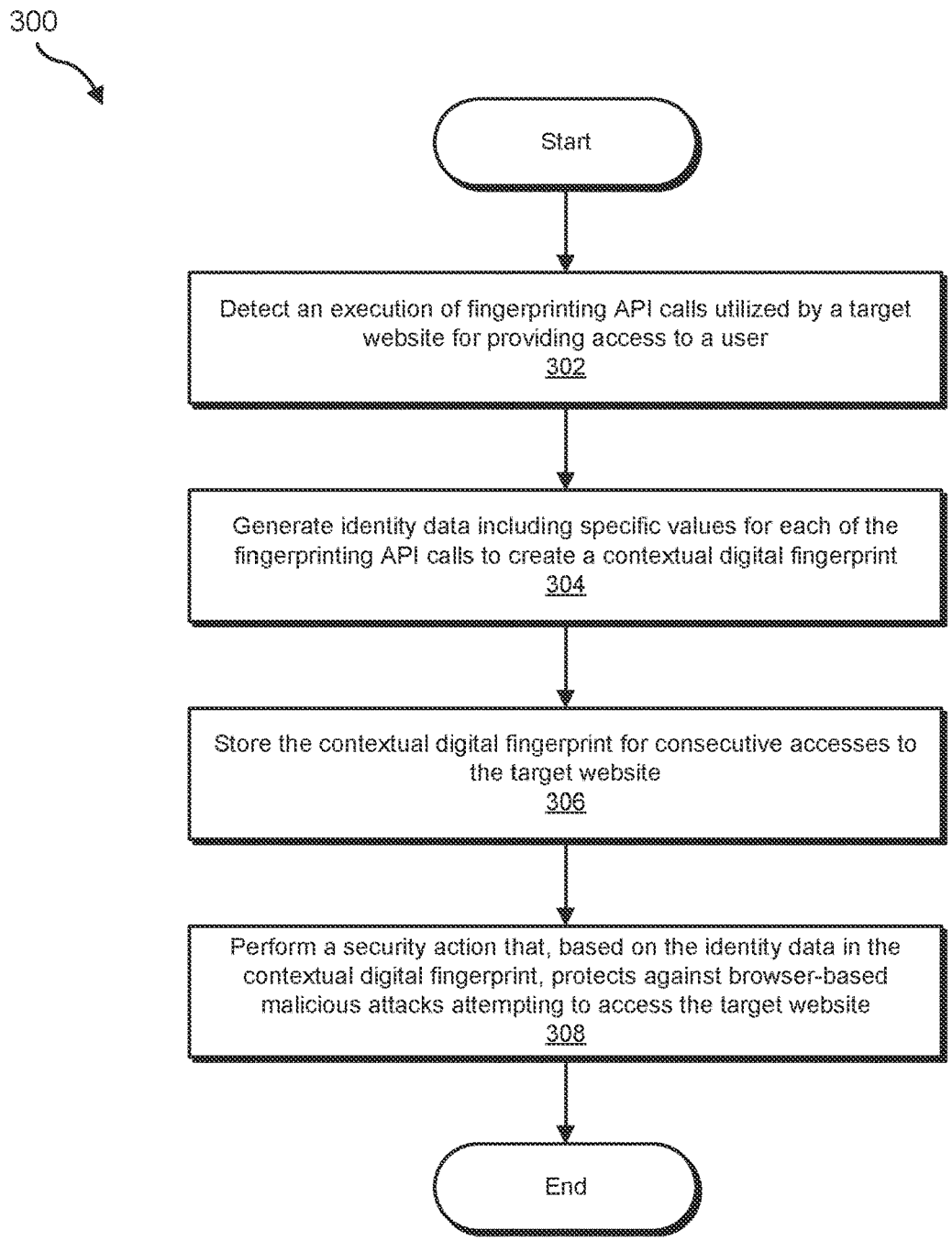
FIG. 3 is a flow diagram of an example method for utilizing contextual digital fingerprints to protect against browser-based malicious attacks.

FIG. 3 is a flow diagram of an example computer-implemented method 300 for utilizing contextual digital fingerprints to protect against browser-based malicious attacks. The steps shown in FIG. 3 (and also shown in the flow diagram of an example computer-implemented method 500 in FIG. 5) may be performed by any suitable computer-executable code and/or computing system, including system 100 in FIG. 1, system 200 in FIG. 2, and/or variations or combinations of one or more of the same. In one example, each of the steps shown in FIG. 3 (and also in FIG. 5) may represent an algorithm whose structure includes and/or is represented by multiple sub-steps, examples of which will be provided in greater detail below.

As illustrated in FIG. 3, at step 302 one or more of the systems described herein may detect an execution of fingerprinting API calls utilized by a target website for providing access to a user (e.g., a web browser user). For example, detection module 104 may, as part of computing device 202 in FIG. 2, detect an execution of one or more fingerprinting API calls 112 utilized by a target website 114 for providing access to a user.

Detection module 104 receive may detect the execution of fingerprinting API calls 112 in a variety of ways. In some examples, detection module 104 may monitor in real-time (e.g., utilizing a web browser or a browser extension) the execution of the fingerprinting API calls 112. Then, detection module 104 may identify one or more programming code functions 212 returned in response to fingerprinting API calls 112.

At step 304, one or more of the systems described herein may generate identity data including specific values for each of the fingerprinting API calls to create a contextual digital fingerprint. For example, identity module 106 may, as part of computing device 202 in FIG. 2, generate identity data 116 including specific values for fingerprinting API calls 112 to create a contextual digital fingerprint 118.

Identity module 106 may generate identity data 116 in a variety of ways. In some examples, identity module 106 may generate the specific values for each of a set of fingerprinting API calls 112 to a programming code function 212. For example, identity module 106 may examine different fingerprinting APIs that are being utilized by a target website 114 (e.g., HTMLCanvasElement or Screen.width) and then instrument programming code functions 210 (e.g., JavaScript functions) called by the APIs (i.e., fingerprinting API calls 112) to determine their usage. Then, identity module 106 may generate specific values for each of a set of fingerprinting calls 112 (e.g., color modification of X tones for every Y pixels).

In some examples, identity module 106 may further link a contextual digital fingerprint 118 with a predetermined location. For example, identity module 106 may utilize either a VPN tunnel or a proxy to link a contextual digital fingerprint 118 with a geographic location associated with a user (e.g., the user's country of residence) accessing a target website 114. Additionally or alternatively, identity module 106 may utilized the aforementioned VPN tunnel or a proxy to link a contextual digital fingerprint 118 with a language spoken by a user accessing a target website 114. In some examples, identity module 106 may directly link a contextual digital fingerprint 118 (e.g., by utilizing an external service) or connect to a previously installed service on computing device 202 and then adapting any output traffic accordingly.

Figure 4:
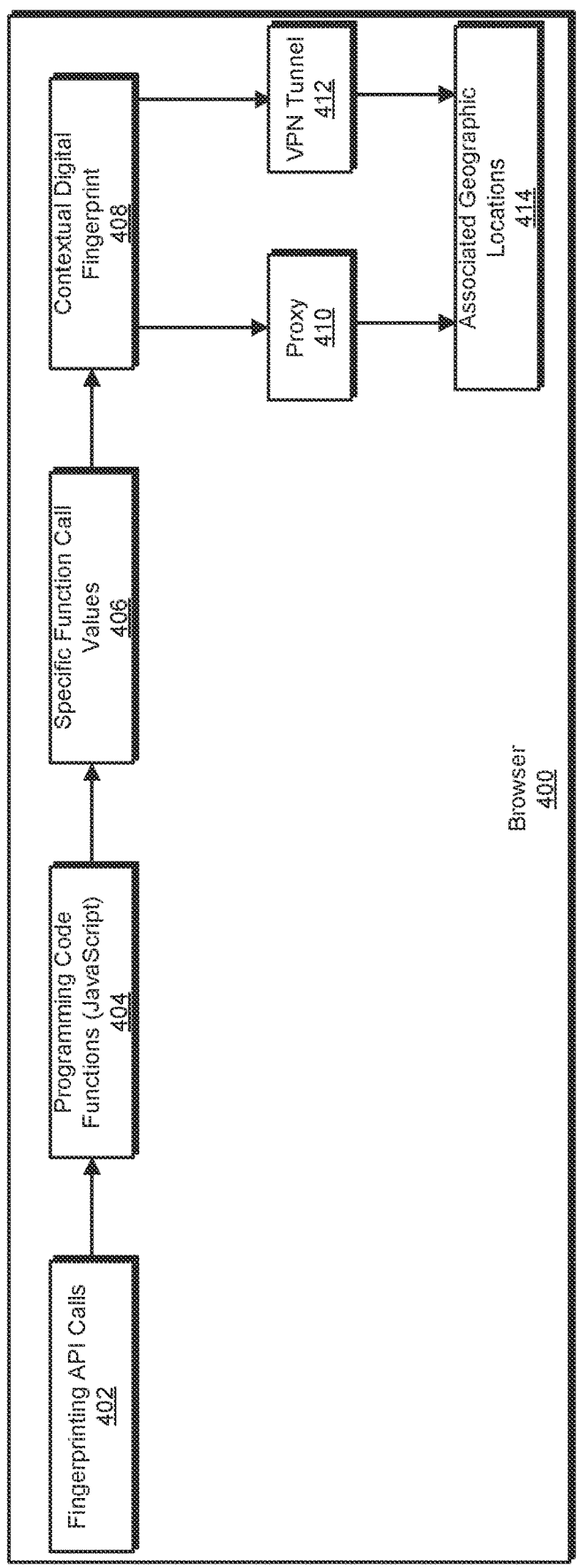
FIG. 4 is a block diagram of an example system for creating contextual digital fingerprints to protect against browser-based malicious attacks.
Figure 5:
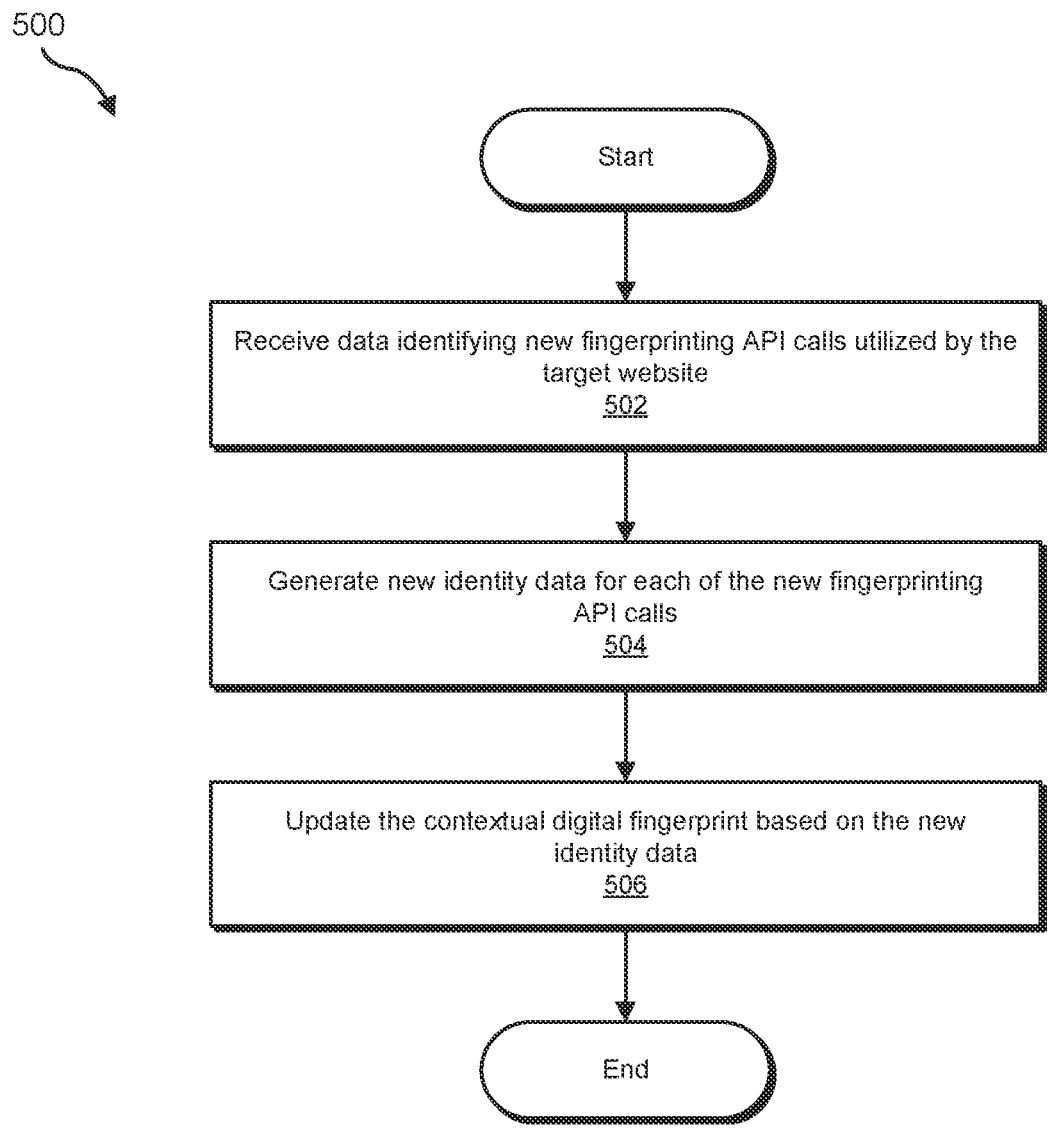
FIG. 5 is a flow diagram of another example method for utilizing contextual digital fingerprints to protect against browser-based malicious attacks.

For example, and as shown in FIG. 4, identity module 106 may be executed by a browser 400. In this example, identity module 106 may examine fingerprinting API calls 402 for programming code functions 404 and then (as described above) generate specific function call values 406 to create a contextual digital fingerprint 408. Additionally, by utilizing either a proxy 410 or a VPN tunnel 412, identity module 106 may further link contextual digital fingerprint 408 with associated geographic locations 414.

In some examples, identity module 106 may further update previously generated contextual digital fingerprints whenever new fingerprinting APIs are called on for future accesses to a target website 114. For example, and turning now to FIG. 5, at step 502, one or more of the systems described herein may receive data identifying new fingerprinting API calls utilized by the target website. For example, identity module 106 may, as part of computing device 202 in FIG. 2, receive data identifying new fingerprinting API calls (e.g., Navigator.userAgent and HTMLElement.offsetWidth) utilized by a target website 114.

At step 504, one or more of the systems described herein may generate new identity data for each of the new fingerprinting API calls. For example, identity module 106 may, as part of computing device 202 in FIG. 2, generate new identity data (e.g., new specific values) for each of the new fingerprinting API calls (e.g., Navigator.userAgent and HTMLElement.offsetWidth) as described above with respect to step 304 of FIG. 3.

At step 506, one or more of the systems described herein may update the contextual digital fingerprint based on the new identity data. For example, identity module 106 may, as part of computing device 202 in FIG. 2, update a contextual digital fingerprint 118 based on the new identity data generated for the new fingerprinting API calls at step 504.

Returning now to FIG. 3, at step 306, one or more of the systems described herein may store the contextual digital fingerprint for consecutive accesses to the target website. For example, storage module 108 may, as part of computing device 202 in FIG. 2, store a contextual digital fingerprint 118 for consecutive user accesses to a target website 114.

Storage module 108 may store a contextual digital fingerprint 118 in a variety of ways. In some examples, storage module 108 may save a contextual digital fingerprint 118 as encrypted data to a local client storage device (e.g., a memory of computing device 202). Additionally or alternatively, storage module 108 may save a contextual digital fingerprint 118 as encrypted data to password manager service 208 on security server 206.

At step 308, one or more of the systems described herein may perform a security action that, based on the identity data in the contextual digital fingerprint, protects against browser-based malicious attacks attempting to access the target website. For example, security module 110 may, as part of computing device 202 in FIG. 2, perform a security action that against browser-based malicious attacks (e.g., phishing) attempting to access a target website 114.

Security module 110 may perform the security action in variety of ways. In some embodiments, security module 110 may prevent a phishing website utilized in a browser-based malicious attack from accessing identity data 116 generated for a contextual digital fingerprint 118 (e.g., by maintaining the storage of contextual digital fingerprint 118 as encrypted data to either a local client storage device or on password manager service 208). For example, if a malicious actor creates a phishing website for a target website 114, they will not have the identity (i.e., a contextual digital fingerprint 118) associated with a target website 114, but a different one since the malicious actor would not have access to the encrypted data storage. As a result, the phishing website would not be able to generate a same contextual digital fingerprint 118 generated by identity module 106. Thus, any attack initiated by the phishing website would not be successful and a target website 114 may then require an additional authentication method, such as two-factor authentication, for granting access to a target website 114.

As explained in connection with method 300 above, the systems and methods described herein utilize contextual digital fingerprints to protect against browser-based malicious attacks. The systems and methods described herein may create contextual digital fingerprints for a set of predefined websites, a set of websites associated with a user account, and/or any website accessed by a user from a browser, that will enable the continuing use of provided web services (e.g., banking, healthcare, etc.) while also avoiding malicious attacks (e.g., phishing attacks such as identity theft) utilizing stolen identities to bypass traditional security protections, such as two-factor authentication. In some examples, the contextual digital fingerprints may be created (e.g., by utilizing either a browser extension or a custom web browser) by detecting the different fingerprinting APIs utilized by a website, viewing any API function calls (e.g., JavaScript function calls), and then generating specific values for each of the calls. By creating contextual digital fingerprints in this way (and subsequently storing them for consecutive accesses to their associated websites), the systems and methods described herein may enable users to access these websites without any anomalies being detected while also preventing malicious actors from carrying out malicious attacks utilizing stolen credentials to create fraudulent user digital fingerprints, as these fingerprints will be rejected as being different than the contextual digital fingerprints. Additionally, the systems and methods described herein may associate contextual digital fingerprints (i.e., identities) to certain geographic location using either a proxy or VPN tunnel. Additionally, the systems and methods described herein may updated previously generated contextual digital fingerprints whenever new fingerprinting APIs are called on for future accesses to websites.

Figure 6:
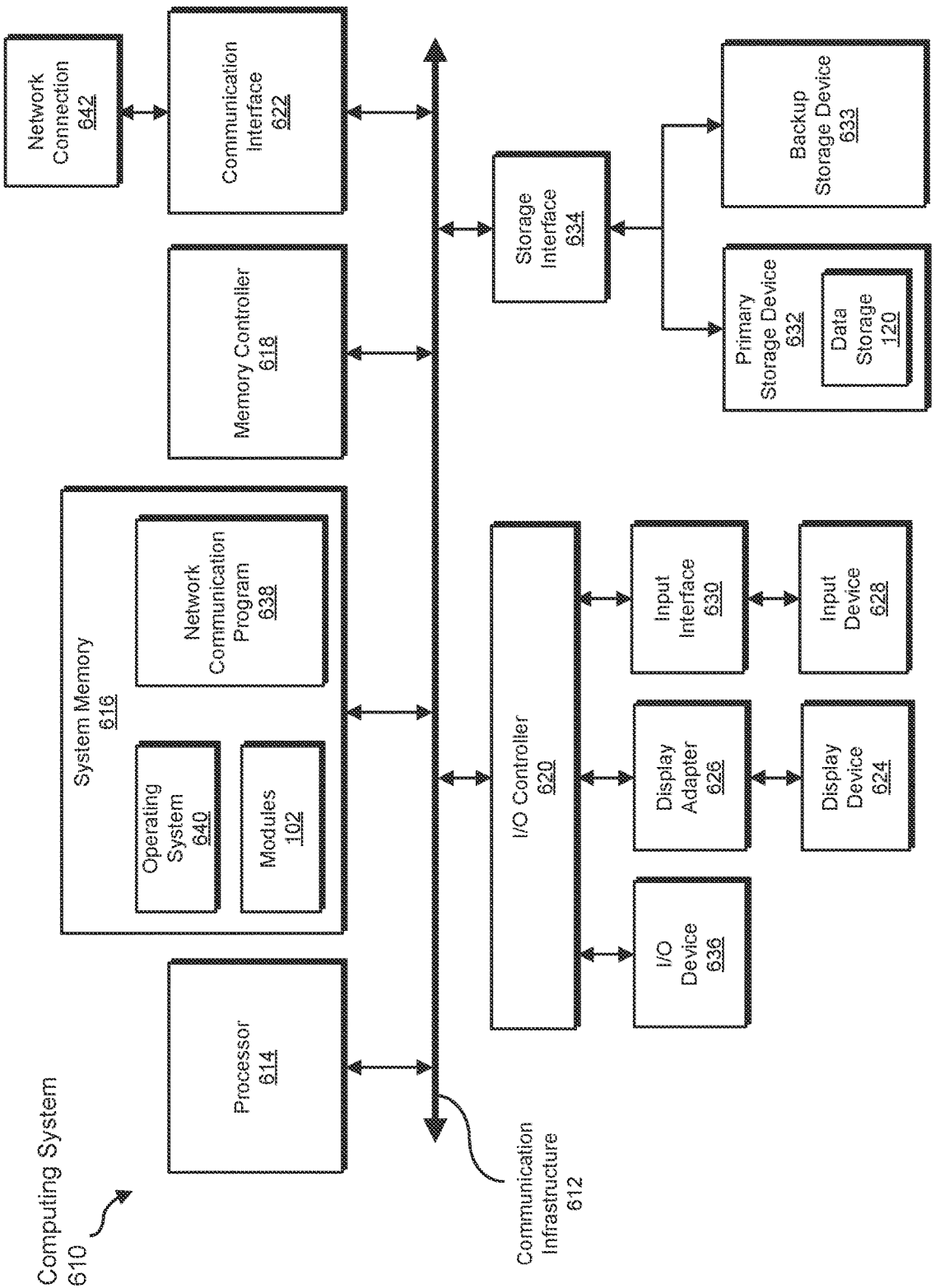
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
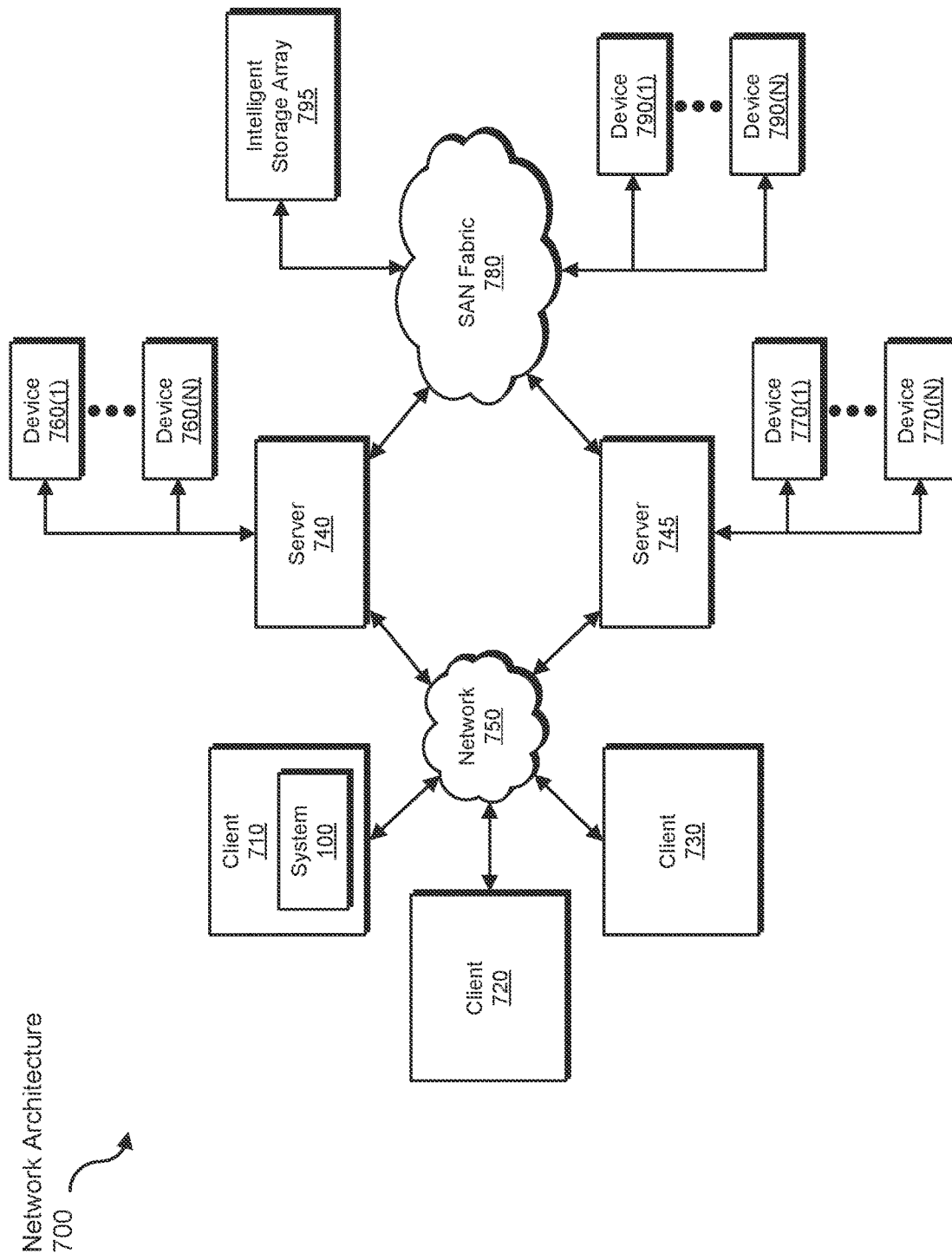
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for utilizing contextual digital fingerprints to protect against browser-based malicious attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for utilizing contextual digital fingerprints to protect against browser-based malicious attacks, at least a portion of the method being performed by one or more computing devices comprising at least one processor, the method comprising:
   detecting, by the one or more computing devices, an execution of one or more fingerprinting application programming interface (API) calls utilized by a target website for providing access to a user;
   generating, by the one or more computing devices, a contextual digital fingerprint that is specific to the target website by generating new values specific to the target website for each of the fingerprinting API calls;
   storing, by the one or more computing devices, the contextual digital fingerprint for consecutive accesses to the target website using the contextual digital fingerprint; and
   performing, by the one or more computing devices, a security action that, based on the contextual digital fingerprint, protects against browser-based malicious attacks attempting to access the target website.

2. The computer-implemented method of claim 1, wherein detecting the execution of the fingerprinting API calls utilized by the target website for providing access to the user comprises:

monitoring, by at least one of a web browser and a browser extension and in real-time, the execution of the fingerprinting API calls; and identifying one or more programming code functions returned in response to the fingerprinting API calls.

3. The computer-implemented method of claim 1, wherein generating the contextual digital fingerprint further comprises linking the contextual digital fingerprint with a predetermined location.

4. The computer-implemented method of claim 3, wherein linking the contextual digital fingerprint with the predetermined location comprises utilizing a virtual private network (VPN) tunnel to link the contextual digital fingerprint with a geographic location associated with a user accessing the target website.

5. The computer-implemented method of claim 3, wherein linking the contextual digital fingerprint with the predetermined location comprises utilizing a proxy to link the contextual digital fingerprint with a geographic location associated with a user accessing the target website.

6. The computer-implemented method of claim 1, wherein generating the contextual digital fingerprint further comprises:

receiving data identifying one or more new fingerprinting API calls utilized by the target website;

generating new identity data for each of the new fingerprinting API calls based on the target website; and updating the contextual digital fingerprint based on the new identity data.

7. The computer-implemented method of claim 1, wherein generating the contextual digital fingerprint comprises generating the specific values for each of a plurality of calls to a programming code function.

8. The computer-implemented method of claim 1, wherein storing the contextual digital fingerprint for the consecutive accesses to the target website comprises saving the contextual digital fingerprint as encrypted data to at least one of a local client storage device and a password manager service.

9. The computer-implemented method of claim 1, wherein performing the security action comprises preventing a phishing website utilized in the browser-based malicious attacks from accessing the identity data generated for the contextual digital fingerprint.

10. The computer-implemented method of claim 1, wherein the contextual digital fingerprint is created utilizing at least one of a web browser or a web browser extension.

11. A system for utilizing contextual digital fingerprints to protect against browser-based malicious attacks, the system comprising:

at least one physical processor;

physical memory comprising computer-executable instructions and one or more modules that, when executed by the physical processor, cause the physical processor to:

detect, by a detection module, an execution of one or more fingerprinting application programming interface (API) calls utilized by a target website for providing access to a user;

generate, by an identity module, a contextual digital fingerprint that is specific to the target website by generating new values specific to the target website for each of the fingerprinting API calls;

store, by a storage module, the contextual digital fingerprint for consecutive accesses to the target website using the contextual digital fingerprint; and perform, by a security module, a security action that, based on the contextual digital fingerprint, protects against browser-based malicious attacks attempting to access the target website.

12. The system of claim 11, wherein the detection module detects the execution of the fingerprinting API calls utilized by the target website for providing access to the user by:

monitoring, by at least one of a web browser and a browser extension and in real-time, the execution of the fingerprinting API calls; and identifying one or more programming code functions returned in response to the fingerprinting API calls.

13. The system of claim 11, wherein the identity module further links the contextual digital fingerprint with a predetermined location.

14. The system of claim 13, wherein the identity module links the contextual digital fingerprint with the predetermined location by utilizing a virtual private network (VPN) tunnel to link the contextual digital fingerprint with a geographic location associated with a user accessing the target website.

15. The system of claim 13, wherein the identity module links the contextual digital fingerprint with the predetermined location by utilizing a proxy to link the contextual digital fingerprint with a geographic location associated with a user accessing the target website.

16. The system of claim 11, wherein the identity module further:

receives data identifying one or more new fingerprinting API calls utilized by the target website;

generates new identity data for each of the new fingerprinting API calls; and updates the contextual digital fingerprint based on the new identity data.

17. The system of claim 11, wherein the identity module generates the contextual digital fingerprint by generating the specific values for each of a plurality of calls to a programming code function.

18. The system of claim 11, wherein the storage module stores the contextual digital fingerprint for the consecutive accesses to the target website by saving the contextual digital fingerprint as encrypted data to at least one of a local client storage device and a password manager service.

19. The system of claim 11, wherein the security module performs the security action by preventing a phishing website utilized in the browser-based malicious attacks from accessing the identity data generated for the contextual digital fingerprint.

20. A non-transitory computer-readable medium comprising one or more computer-executable instructions that, when executed by at least one processor of a computing device, cause the computing device to:

detect an execution of one or more fingerprinting application programming interface (API) calls utilized by a target website for providing access to a user;

generate a contextual digital fingerprint that is specific to the target website by generating new values specific to the target website for each of the fingerprinting API calls;

store the contextual digital fingerprint for consecutive accesses to the target website using the contextual digital fingerprint; and perform a security action that, based on the contextual digital fingerprint, protects against browser-based malicious attacks attempting to access the target website.

\* \* \* \* \*